March 11, 1958  G. PANCIROLI  2,826,097
STEPLESS AND AUTOMATIC CHANGE SPEED TRANSMISSION
Filed July 27, 1954  2 Sheets-Sheet 1
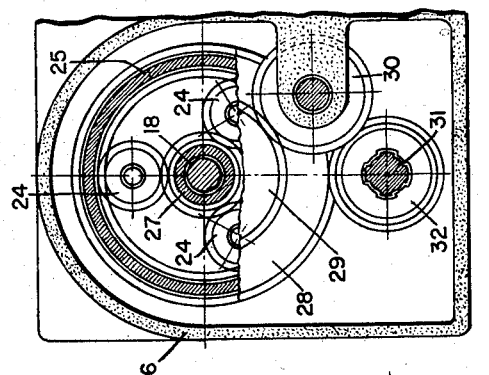
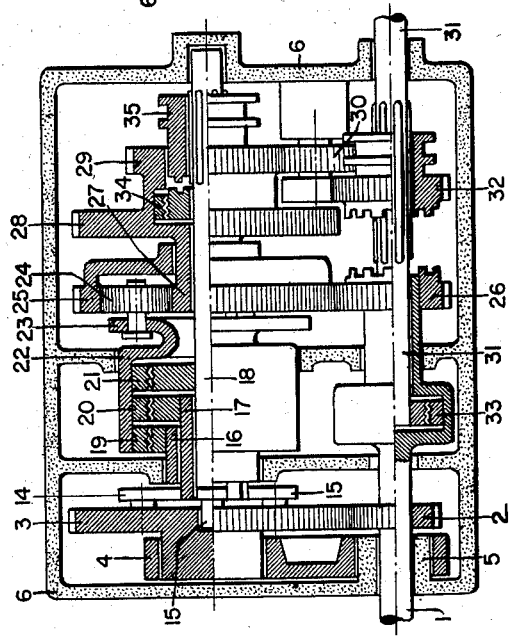
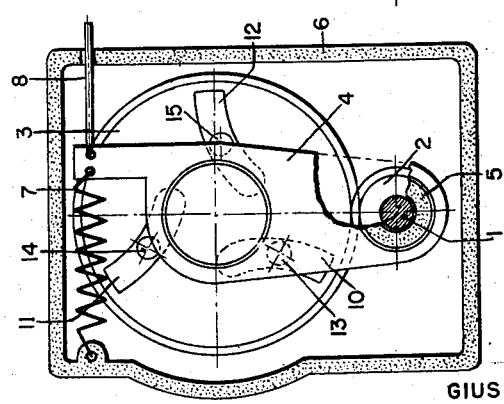
INVENTOR
GIUSEPPE PANCIROLI March 11, 1958 G. PANCIROLI 2,826,097
STEPLESS AND AUTOMATIC CHANGE SPEED TRANSMISSION
Filed July 27, 1954 2 Sheets-Sheet 2
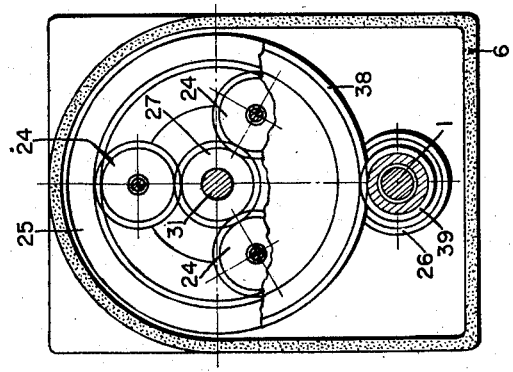
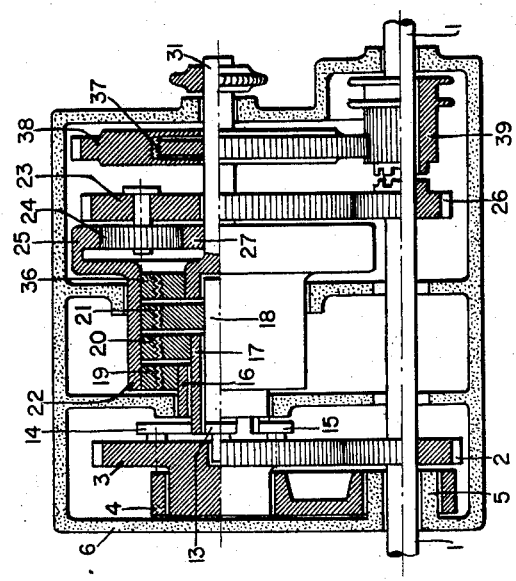
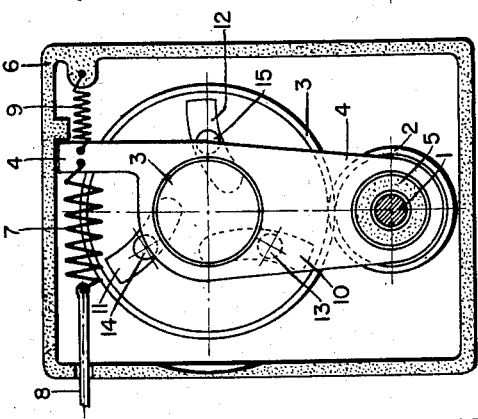
INVENTOR
GIUSEPPE PANCIROLI

United States Patent Office 2,826,097
Patented Mar. 11, 1958

2,826,097

STEPLESS AND AUTOMATIC CHANGE SPEED TRANSMISSION

Giuseppe Panciroli, Reggio Emilia, Italy

Application July 27, 1954, Serial No. 446,060

Claims priority, application Italy August 4, 1953

13 Claims. (Cl. 74—679)

The subject of this invention is a stepless and automatic change speed transmission, based, like many other similar transmissions, on the transformation of a uniform rotary motion into a plurality of rotary periodically varied motions, said rotary motions being of adjustable amplitude, symmetrically off-set and, by means of free-wheeling devices, only partially operated, whereas the speed of the rotary motion resulting from the consecutive operation of said usable parts is decreased by means of differential-reducer gearing, reference being had to my co-pending application Serial No. 340,065 filed March 3, 1953.

The main feature of this change speed transmission is the resulting uniform speed of said rotary motion, the uniform speed being obtained through motion transforming means, having crank arms and pins therewith sliding along sinusoidally curved slots.

Since all other change-speed transmissions, based on the above principle, have a resulting rotary motion of wave form characteristics, i. e. a pulsating motion, so that said transmissions are considered non-feasible; there is herein evidence of the great importance of this invention, which purpose is to improve its mechanism by excluding said inconvenience.

Also improved is the system to render automatic the stepless speed change gear of a driven shaft, by means of a spring applied and operating on the bearing of the sliding slots of said motion transforming means, in a direction of turning opposite to the action applied on said sliding slot bearing by the momentum generated by the resistance applied to said driven shaft.

Further said transmission gear is so located as to make it apt for mounting either on automobiles and motorcycles; up to now this advantage was not offered by other similar transmissions.

Two drawings are enclosed offering two examples of mechanical devices; the first drawing (including a direct coupling and back gears) is one specially fit for application to automobiles; the second drawing (showing a much more plain and much less-space-taking device) is one specially fit for motorcycles.

Figs. 1 and 4 are two end elevations of motion transforming means and of self-acting means respectively for automobile and for motorcycle change speed transmission.

Figs. 2 and 5 are two longitudinal elevations respectively for automobile and for motorcycle change speed transmission.

Figs. 3 and 6 are two end elevations of said differential-reducer gearing respectively for automobile and for motorcycle change speed transmission.

On driving shaft 1 is keyed a toothed wheel 2 meshable with sliding slot disc 3 having teeth arranged on the outside circle and hinged on the side thereof inside pendulum bearing 4 rotatable around sleeve 5 projecting inwardly from endwall of box 6, (said box housing the whole change speed transmission) and being disposed co-axially—with driving shaft 1. Said pendulum bearing 4 is inclinable by means of great spring 7 operable either by rod 8 alone (Fig. 1) or by the combination of rod 8 together with small back spring 9 (Fig. 4). Sliding slots 10, 11, 12 are carved at equal angles into disc 3, wherein pins 13, 14, 15 of corresponding crank arms are slidable, each crank arm being cast with one of the auxiliary shafts 16, 17, 18 (last two being tubular shafts) carrying the driving means of free-wheeling devices 19, 20, 21, driven means thereof being all cast with drum 22.

By this change speed transmission, as shown in Figs. 1, 2, 3, drum 22 is cast with gearing train carrying member 23, whereon are pivoted planetary gears 24 engageable externally with wheel 25 having teeth arranged on the inside circle, said wheel has teeth arranged also on the outside circle and is meshable in turn with toothed wheel 26 keyed on driving shaft 1; and internally with sun gear 27 cast with toothed wheels 28 and 29, the latter being meshable with toothed wheel 30. Toothed wheels 28 and 30 are connectable with driven shaft 31 by the intermediary of toothed wheel 32 being cast for rotating with driven shaft 31, but movable along driven shaft 31 to mesh either toothed wheels 28 and 30 and, also separately, toothed wheel 26. Finally free wheeling devices 33 and 34 intermediate driving shaft 1 and auxiliary shaft 18 connect said shafts, in the same direction of turning, respectively to driven shaft 31 and (with the help of an engageable sleeve 35) to the unit comprising toothed wheels 28 and 29.

In this change speed transmission, as shown Fig. 4, 5, 6, drum 22 is, instead, cast with wheel 25 having teeth arranged on an inside circle, whereas it is gearing train carrying member 23 that has teeth arranged on the outside circle and is engageable with toothed wheel 26 keyed on driving shaft 1, while planetary gears 24, hinged on said gearing train carrying member 23, are externally meshable with said inside-toothed wheel 25 and internally with sun gear 27 directly cast with driven shaft 31; said driven shaft 31 carries keyed on, the following: on one side the element of free-wheeling device 36, driven member thereof being keyed on with drum 22; on the other side the driving element of free-wheeling device 37, driven element thereof being cast with toothed wheel 38 engageable with toothed wheel 39 at standstill on driving shaft 1 and movable along said driving shaft to clutch laterally with toothed wheel 26.

It is obvious that above two methods for coupling said gearing train carrying member 23 and inside-toothed wheel 25, are applicable to both change speed transmissions.

Ratio of gear consisting of toothed wheel 2 and slotted disc 3; ratio of differential gearing including planetary gears 24, inside-toothed wheel 25 and sun gear 27; ratio of gear consisting of an outside-toothed system of the inside-toothed wheel 25, that is constituted by the outside-teeth range of gearing train carrying member 23 and by toothed wheel 26, are proportioned in a manner that, when the sliding slot disc axis 3 and the common axis of auxiliary shafts 16, 17, 18 are in alignment, sun gear 27 and elements therewith connected, remain fully still. Rod 8 is used to: (a) in the case of Fig. 1, to call sliding slot disc 3 back into such position, whereby its axis is in alignment with the common axis of auxiliary shafts 16, 17, 18; (b) in the case of Fig. 4, to set to traction big spring 7, whereas the call of slotted disc 3 back into position, wherein its axis is in alignment with the common shaft of auxiliary shafts 16, 17, 18, is made by small spring 9. Free wheeling devices 19, 20, 21 are apt to rotate drum 22, in the type of change speed transmission shown Figs. 1, 2, 3; and are apt to brake that is to keep fast drum 22 in the type of change speed transmission shown Figs. 4, 5, 6. Sliding slots 10, 11, 12 are wave sinusoidally shaped; their extreme ends are set along different spoke-lines (in respect to the rotation axis of disc 3), that is as to form an angle; and their slopes are turned toward the direction of turning of free-wheeling devices 19, 20, 21, that is toward the direction of rotation of disc 3 in the change speed transmission of Figs. 1, 2, 3 and toward the direction opposed to the rotation direction of disc 3 in the change speed transmission of Figs. 4, 5, 6.

Above 2 change speed transmissions operate as follows:

Motion of driving shaft 1 is transmitted, with the intermediary of toothed wheel 2 to sliding slot disc 3; pendulum bearing 4 thereof is tipped by means of big spring 7 toward a direction contrary to the action applied on same bearing 4 by a momentum originating from the resistance duly applied to driven shaft 31. Consequent to slot disc 3 being off-set from crank arms 13, 14, 15, said position determined by the tipping of bearing 4, the rotary motions of auxiliary shafts 16, 17, 18 become periodically variable, of adjustable amplitude and symmetrically off-set; by means of free-wheeling devices 19, 20, 21, drum 22 receives only parts having higher or lower speed, depending on the type of change speed transmission, as shown Figs. 1, 2, 3 or on the change speed transmission shown in Figs. 4, 5, 6. For one position of slot disc 3, by steplessly operating one after the other, these parts build a resulting rotary stepless motion, having a speed higher or lower than the average speed of auxiliary shafts 16, 17, 18, said speed being also perfectly uniform, because of the wave sinusoidal shape of sliding slots 10, 11, 12, so that also the rotation speed of drum 22 is perfectly uniform. Little discrepancies of uniformity, that are verified when slot disc 3 is not in such a position to give a perfect result, are easily and automatically eliminated by the equalizing action of spring 7. Speed increase or decrease of drum 22 in respectively change speed transmissions of Figs. 1, 2, 3 and Figs. 4, 5, 6 determine the rotation of sun gear 27: (a) in the case of Figs. 1, 2, 3 by means of gearing train carrying member 23 and planetary gears 24, rotation speed thereof being differentially reduced by the inside-toothed wheel 25 receiving the motion from driving shaft 1 by means of toothed wheel 26; (b) in the case of Figs. 4, 5, 6 by means of inside-toothed wheel 25 and planetary gears 24, revolution speed thereof remaining unchanged; because gearing train carrying member 23 receives its motion from driving shaft 1 by means of toothed wheel 26. In the change speed transmission as at Figs. 1, 2, 3 the rotation of sun gear 27 determines then the rotation of toothed wheels 28, 29, 30 and finally the rotation of driven shaft 31 in the same or in the opposite direction of turning of driving shaft 1, depending on toothed wheel 32 meshing with toothed wheel 28 or toothed wheel 30. In the change speed transmission as of Figs. 4, 5, 6, instead, the rotation of sun gear 27 determines directly the rotation, in only one direction of turning, of driven shaft 31.

Since changes of rotation speed of drum 22 are in relation with the amplitude of periodically variable rotary motion of auxiliary shafts 16, 17, 18; since said amplitude is in relation with the inclination of slot disc 3; since said inclination is in relation with the value of the momentum generated by the resistant work applied to driven shaft 31; it is understood that also the rotation speed of said driven shaft 31 is proportioned to the value of said momentum.

In a change speed transmission, as shown in Figs. 1, 2, 3, the following positions can be obtained: disengagement gear (whereby toothed wheel 32 is meshed with none of toothed wheels 26, 28, 30); standstill (whereby the axis of slot disc 3 is in alignment with the common axis of auxiliary shafts 16, 17, 18); forward gear (whereby toothed wheel 32 is meshed with toothed wheel 28); back gear (whereby toothed wheel 32 is meshed with toothed wheel 30); direct gear connection (whereby toothed wheel 32 is meshed with toothed wheel 26); motion reversability according to a ratio equal to the ratio at which the maximum rotation speed of driven shaft 31 operates (free-wheeling device 33 clamping driven shaft 31 with driving shaft 1, when rotation speed of driving shaft 1 decreases to a rate lower than that of said driven shaft 31); motion reversability according to a ratio lower than the ratio at which operates the maximum rotation speed of driven shaft 31 (free-wheeling device 34 clamping toothed wheel 28 and 29 with auxiliary shaft 18, when rotation speed of said auxiliary shaft 18 decreases to a lower rate than that of toothed wheels 28, 29).

In a change speed transmission, as shown in Figs. 4, 5, 6, following positions can be obtained: standstill (whereby the axis of slot disc 3 is in alignment with the common axis of auxiliary shafts 16, 17, 18); forward gear (whereby driven shaft 31 is always cast with sun gear 27); motion reversability, at a ratio equal to the ratio at which maximum rotation speed of driven shaft 31 operates (free-wheeling device 36 clamping driven shaft 31 with drum 22, when rotation speed of said drum 22 decreases to a rate lower than the rate of driven shaft 31); motion reversability at a ratio lower than that at which the maximum rotation speed of driven shaft 31 operates (free-wheeling device 37 clamping driven shaft 31 with toothed wheel 38, when rotation speed of said toothed wheel 38 decreases to a rate lower than that of said driven shaft 31).

Finally, the overall dimensions of the change speed transmission, as shown in Figs. 4, 5, 6, can be further reduced excluding, where possible, driving shaft 1 and transmitting the motion direct from the motor to slot disc 3 and to gearing train carrying member 23. Thereto, toothed wheels 2 and 26 must be keyed on one side the former, on the other side the latter, of the motor goose-neck shaft; alternatively they must be keyed on the same side, but transmitting the motion to gearing train carrying member 23 by means of another toothed wheel keyed on a shaft located inside of auxiliary shafts 16, 17, 18. Motion transmission from motor goose-neck shaft to slot disc 3 and to gearing train carrying member 23, can besides take place by means of chain-connected toothed wheels instead of with toothed wheels meshing each other.

It is understood that constructive details hereof may change within a wide range, without going, however, beyond the limitations of the invention, such as indicated in the following claims.

I claim:

1. A stepless and automatic change speed transmission, having a driving shaft and a driven shaft, in combination with, a mechanism intermediate said driving and driven shafts comprising a series of coaxially arranged revoluble auxiliary shafts each including a crank arm having a pin, a rotary member driven at uniform speed from said driving shaft and being tiltable about the axis of said driving shaft between a neutral position wherein the axis of rotation of said member is aligned with the axis of said auxiliary shafts and, respectively, tilted positions angularly spaced from said neutral position, said rotary member having a series of slots each engaging a pin, and each slot having a sinusoidal shape having a radial outer terminal portion, said terminal portions being uniformly angularly off-set from each other, a differential gear device including an inner gear means having external toothing, an outer gear means having internal toothing and planetary gear means in mesh with said inner and outer gear means, a unidirectional transmission mechanism connected to one of said gear means and driven by said auxiliary shafts, a second of said gear means being in driven connection with said driving shaft, and a third of said gear means being in driving connection with said driven shaft, a guide pivoted about the axis of said driving shaft and journalling said rotary member and being operable to tilt said rotary member between the positions thereof, resilient means biasing said guide, in opposition to a tilting momentum imparted to said guide by the load applied to said driven shaft, to tilt said rotary member from said neutral position for an angle proportional to said load, whereby in the tilted position the uniform rotary speed of said member will rotate said auxiliary shafts at a variable speed, components of which will be imparted to said transmission mechanism and therefrom transmitted to said differential gear device and to said driven shaft.

2. A stepless and automatic change speed transmission, as claimed in claim 1, having a driving shaft parallel to the driven shaft intermediate said slot disc axis and one of the axis of the differential-reducer gearing by means of reducing gears.

3. A stepless and automatic change speed transmission, as claimed in claim 1, characterized in that to the slot disc bearing, at a position opposite to that, where a spring is applied to make automatic the stepless speed variations of a driven shaft, is applied a rod, by which sliding slot axis may be re-set in alignment with the common axis of the auxiliary shafts.

4. A stepless and automatic change speed transmission, as claimed in claim 1, having a rod operable for gradually setting said speed in traction and fixed to the end opposite a spring applied to the slot disc bearing, for rendering automatic the stepless speed variations of the driven shaft, whereas a small back spring for re-setting the slot disc axis in alignment with auxiliary shafts' common axis, when the former is no more in traction, is fixed to the side opposite of the slot disc bearing, where said spring is applied.

5. A stepless and automatic change speed transmission, as claimed in claim 1, having a driven shaft of the differential-reducer gearing coaxially cast with two toothed wheels of different gauge, the larger wheel thereof together with a third wheel meshing in parallel position with the other of smaller gauge, are apt to be meshable separately and independently by a toothed wheel cast for rotation with a driven shaft, but shiftable along said driven shaft, to permit a standstill position and rotation of driven shaft, either in the same direction of turning and in the direction opposite to that of said driving shaft.

6. A stepless and automatic change speed transmission, as claimed in claim 1, having a toothed wheel cast for rotation with a driven shaft, but shiftable along said driven shaft to mesh separately with the toothed wheels, these wheels to generate two different directions of turning of said driven shaft; side teeth of said wheel connecting said toothed wheel to driving shaft, to make said driving and driven shafts cast one with the other.

7. A stepless and automatic change speed transmission, as claimed in claim 1, having the extreme ends of the driving shaft and of the driven shaft connected by free-wheeling devices, actuating the independent rotation of the latter shaft only when its speed is of a rate lower than the former, so that it is possible, in an opposite performance, to trail it into rotation therewith, and obtain a motion reversability at a ratio equal to the ratio of the maximum rotation speed of said driven shaft.

8. A stepless and automatic change speed transmission, as claimed in claim 1, characterized in that, with the intermediary of engaging and disengaging means, one of said toothed wheels, coaxially cast with the driven shaft of the differential-reducer gearing, said wheel is connectable to one of said auxiliary shafts with the intermediary of free-wheeling devices actuating the independent rotation of the toothed wheel only when its speed is of a rate lower than the speed rate of said auxiliary shaft; so that, in an opposite performance, it can be trailed into rotation and obtain a motion reversability at a ratio lower than the ratio of the maximum rotation speed of the driven shaft.

9. A stepless and automatic change speed transmission, as claimed in claim 1, having a slot disc bearing is hinged around a sleeve projecting inwardly of the housing, enclosing the change speed transmission unit and being coaxially disposed to the driving shaft.

10. A stepless and automatic change speed transmission, as claimed in claim 1, having a driven shaft cast directly with the driven element of the differential-reducer gearing.

11. A stepless and automatic change speed transmission, as claimed in claim 1, having a driven shaft connected to the unit of the driven elements of the free-wheeling devices driven by the auxiliary shafts, by means of free-wheeling device permitting said driven shaft to rotate independently, only when its speed is lower than the speed of said unit, so that it is possible, in an opposite performance, to trail it into rotation and obtain a motion reversability at a ratio equal to the ratio governing the maximum rotation speed of said driven shaft.

12. A stepless and automatic change speed transmission, as claimed in claim 1, having a gear intermediate a driving shaft and a driven shaft parallel thereto, a toothed wheel thereof hinged on the driving shaft and shiftable along said shaft and having a side teeth system making said wheel cast with the driving shaft, whereas said toothed wheel hinged on the driven shaft provides a free-wheeling device to make above driven shaft independently rotatable only when its speed is lower than the speed of mentioned toothed wheel; so that, in an opposite performance, and when the toothed wheel hinged on the driving shaft is therewith cast, above wheel trails said driving shaft into rotation, thus obtaining a motion reversability at a ratio different from the ratio governing the maximum rotation speed of the driven shaft.

13. A stepless and automatic change speed transmission, as claimed in claim 1, characterized in that the slot discs axis and the member of the differential-reducer gearing are cast with the driven shaft, and connected with the goose-neck motor shaft, by the intermediary of couples of toothed wheels meshable each other or chain-connected.

References Cited in the file of this patent

UNITED STATES PATENTS

| | | |
|---|---|---|
| 914,108 | Bouchet | Mar. 2, 1909 |
| 1,193,727 | Staude | Aug. 8, 1916 |
| 1,282,495 | Tornberg | Oct. 22, 1918 |

FOREIGN PATENTS

| | | |
|---|---|---|
| 990,178 | France | Sept. 18, 1951 |